United States Patent
Ulrich et al.

(10) Patent No.: US 7,612,994 B2
(45) Date of Patent: Nov. 3, 2009

(54) HARD DRIVE CARTRIDGE PROTECTION

(75) Inventors: Michael H. Ulrich, Boulder, CO (US);
Steven P. Georgis, Boulder, CO (US)

(73) Assignee: Prostor Systems, Inc., Boulder, CO (US)

( * ) Notice: Subject to any disclaimer, the term of this patent is extended or adjusted under 35 U.S.C. 154(b) by 66 days.

(21) Appl. No.: 11/865,473

(22) Filed: Oct. 1, 2007

(65) Prior Publication Data
US 2008/0101008 A1    May 1, 2008

Related U.S. Application Data

(60) Provisional application No. 60/863,717, filed on Oct. 31, 2006.

(51) Int. Cl.
G06F 1/16 (2006.01)
(52) U.S. Cl. .................. 361/679.34; 369/22; 360/97.01
(58) Field of Classification Search .............. 359/22; 360/97.01; 361/679–687, 724–727
See application file for complete search history.

(56) References Cited

U.S. PATENT DOCUMENTS

| | | |
|---|---|---|
| D260,881 S | 9/1981 | McKinsey et al. |
| D311,737 S | 10/1990 | Westwood et al. |
| 5,216,582 A | 6/1993 | Russell et al. |
| 5,694,278 A | 12/1997 | Summer |
| 5,721,655 A | 2/1998 | Thweatt |
| 5,790,374 A | 8/1998 | Wong |
| D413,592 S | 9/1999 | Saiba et al. |
| 5,986,992 A | 11/1999 | Bardmesser |
| 6,064,569 A | 5/2000 | Sands et al. |
| 6,122,232 A | 9/2000 | Schell et al. |
| 6,212,026 B1 | 4/2001 | Ohmi et al. |
| 6,231,224 B1 | 5/2001 | Gamble et al. |
| 6,419,403 B1 | 7/2002 | Buller et al. |
| D462,093 S | 8/2002 | Ashida |
| 6,431,718 B1 | 8/2002 | Gamble et al. |
| 6,457,992 B2 | 10/2002 | Posey et al. |
| 6,473,300 B1 | 10/2002 | Youngquist et al. |
| 6,487,049 B1 | 11/2002 | Hall |
| D470,851 S | 2/2003 | Nishio et al. |
| D474,193 S | 5/2003 | Nakayama |
| D478,358 S | 8/2003 | Ashida |
| 6,611,394 B1 | 8/2003 | Kato et al. |

(Continued)

OTHER PUBLICATIONS

United States Patent & Trademark Office International Search Report and Written Opinion dated May 15, 2008, PCT Application PCT/US07/83029, pp. 1-11.

(Continued)

Primary Examiner—Hung V Duong
(74) Attorney, Agent, or Firm—Townsend and Townsend and Crew, LLP (57) ABSTRACT

According to the invention, a removable rotational disk storage cartridge for storing computer readable data is disclosed. The cartridge may include a chassis, a shock absorption media and a rotational storage disk. The chassis may define an interior space and may be configured to be detachably and mechanically coupled with a cartridge drive. The shock absorption media may be deposited at least partially within the interior space of the chassis and may be a flexible material. The rotational storage disk may be configured to store computer readable data and may be deposited at least partially within the shock absorption media.

24 Claims, 8 Drawing Sheets

U.S. PATENT DOCUMENTS

| | | |
|---|---|---|
| 6,614,751 B1 | 9/2003 | Katao |
| 6,618,795 B2 | 9/2003 | Chan et al. |
| 6,674,596 B1 | 1/2004 | Takayama |
| 6,717,762 B1 | 4/2004 | Bauck et al. |
| 6,717,769 B2 | 4/2004 | Staley et al. |
| 6,728,187 B2 | 4/2004 | Diaz et al. |
| 6,762,930 B2 | 7/2004 | Minne' |
| 6,785,896 B2 | 8/2004 | Huang |
| 6,831,831 B2 | 12/2004 | Bicknell et al. |
| 6,865,640 B2 | 3/2005 | Dimitri et al. |
| 6,892,275 B2 | 5/2005 | Bolt et al. |
| 6,957,291 B2 | 10/2005 | Moon et al. |
| 6,968,561 B2 | 11/2005 | Katao |
| D523,859 S | 6/2006 | Deckers |
| 7,307,836 B2 | 12/2007 | Scicluna et al. |
| 7,321,489 B2 | 1/2008 | McAlister |
| 2002/0135938 A1 | 9/2002 | Hiraguichi et al. |
| 2002/0196577 A1 | 12/2002 | Harmer |
| 2003/0063342 A1 | 4/2003 | Horimai |
| 2003/0149700 A1 | 8/2003 | Bolt |
| 2003/0218957 A1 | 11/2003 | Tanishima |
| 2004/0032711 A1 | 2/2004 | Kaczeus et al. |
| 2004/0081054 A1 | 4/2004 | Nguyen |
| 2004/0181388 A1 | 9/2004 | Yip et al. |
| 2005/0033911 A1 | 2/2005 | Kitamura et al. |
| 2005/0183104 A1 | 8/2005 | Edwards et al. |
| 2005/0193235 A1 | 9/2005 | Sandorfi et al. |
| 2006/0010458 A1 | 1/2006 | Georgis |
| 2006/0061955 A1* | 3/2006 | Imblum ............... 361/685 |
| 2006/0129373 A1 | 6/2006 | Georgis |
| 2007/0025014 A1* | 2/2007 | Kim ............... 360/97.01 |

OTHER PUBLICATIONS

"What is iVDR?," printout from website http://www.ivdr.org/iVDR/ivdr_e.html, 2 pages, printout date: May 27, 2004.

* cited by examiner

HARD DRIVE CARTRIDGE PROTECTION

PRIORITY CLAIM

This application claims priority to Provisional U.S. Patent Application No. 60/863,717 filed Oct. 31, 2006, entitled "Hard Drive Cartridge Protection," the entire disclosure of which is hereby incorporated by reference as if fully set forth herein.

BACKGROUND OF THE INVENTION

Removable media storage systems often employ magnetic tape cartridges to provide reliable long term storage of machine readable information. Magnetic tape cartridges nonetheless suffer from multiple shortcomings. During operation, magnetic tape is very frail, and given the low reliability of highly mechanical tape drive mechanisms, failure of the tape drive mechanism during actual use can result in catastrophic damage to the magnetic tape. However, during handling between periods of actual use, magnetic tape drives provide excellent resistance to mechanical shock which can occur due to accidental bumps and falls.

Hard disk drives provide an alternative means to magnetic tape for storing machine readable information. During operation, hard disk drives offer resilient operation with limited possibility of mechanical failure. Unfortunately, resistance to mechanical shock during periods of handling is very limited. Hard disk drives with significant capacity are typically manufactured with long-term stationary applications in mind, making them unsuitable for removable media storage systems.

BRIEF DESCRIPTION OF THE DRAWINGS

The present invention is described in conjunction with the appended figures.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

In one embodiment of the invention, a removable cartridge for storing computer readable data is provided. The removable cartridge may, merely by way of example, include a chassis, a shock absorption media, and a computer readable data storage device.

The chassis may define an interior space and possibly be configured to be detachably and mechanically coupled with a cartridge drive. In some embodiments, the chassis may be substantially rectangular in shape. In these or other embodiments, the chassis may include a number of subcomponents. Merely by way of example, the chassis may have a top subcomponent, and a bottom subcomponent which may be combined to define the interior space. In other embodiments, different combinations of subcomponents may be combined to define the interior space.

The chassis may define ventilation passages between the exterior of the chassis and the interior of the chassis. The chassis may also define grip features on the exterior of the chassis to assist users in inserting and removing the removable cartridge from the cartridge drive, as well as otherwise handling the removable cartridge.

The computer readable data storage device may be configured to store computer readable data, and may possibly be deposited at least partially within the shock absorption media. In some embodiments, the computer readable data storage device may include a rotational storage disk, for example, a magnetic storage disk or an optical storage disk. In some of these embodiments, the rotational storage disk may include a retractable head assembly.

In some embodiments, the computer readable data storage device may be a hard disk drive, or other type of data storage device, having exterior dimensions that correspond to an industry standard. Merely by way of example, the SFF-8201 specification for 2.5 inch form factor disk drives may specify the exterior dimensions of a computer readable data storage device employed in some embodiments of the invention. Other standardized and/or industry standard sized devices may also be employed.

In some embodiments, the physically standardized computer readable data storage device may have locations on the exterior of the device which are consistent among all such standardized devices, regardless of manufacturer. Merely by way of example, these locations may include (A) "datum points" and (B) "datum areas" which correspond, respectively, to (A) tapped cavities to accept machine screws or other coupling mechanisms, and (B) "pads" or other locations on the exterior of the standardized devices where certain exterior dimensions will always be consistent amongst devices. Merely by way of example, a circular area on the outside of the case, surrounding a datum point may have a specified diameter within the standardization, and may be located at locations specified by the standard in relation to other exterior dimensions, including other datum points and/or datum areas. These standardized locations may allow for other equipment to be configured to accept all computer readable data storage devices adhering to the particular standard involved.

Referring to the SFF-8201 specification for the 2.5 inch form factor may include datum areas with centers on the sides of a device at about 14 millimeters (about 0.551 inches) and 90.6 millimeters (about 3.567 inches) from one end. The SFF-8201 specification may also include datum areas with centers on the top and bottom of the same device at about 14 millimeters (about 0.551 inches) and 90.6 millimeters (about 3.567 inches) from one end. The datum areas may be about 8 millimeters (about 0.315 inches) in diameter and may be tangentially or otherwise located at an edge of the device. The "SFF-8201 Specification for Form Factor of 2.5" Disk Drives" as of May 30, 2005 contains additional description of such form factor, and is hereby incorporated by reference, for all purposes, as if fully set forth herein.

In other embodiments, the computer readable data storage device may include a solid state storage device, for example, a flash drive having non-volatile computer memory. In yet other embodiments, the computer readable data storage may include a self-reading/writing tape drive or possibly a removable media drive which may be configured, along with the chassis and shock absorption media, to allow removable media to be inserted and removed from the removable media drive.

In some embodiments, the shock absorption media may be a singular component. In other embodiments, the shock absorption media may be a plurality of components. The shock absorption media may be deposited at least partially within the interior space of the chassis, and may be made, at least in part, from a flexible material. In these or other embodiments, the shock absorption media, which at least partially encases the computer readable data storage device, may be at least partially compressed between the chassis and the computer readable data storage device. The shock absorption media may be configured such that data interface connections of the computer readable data storage device are unobstructed.

In some embodiments, an interference fit may couple the computer readable data storage device within the shock absorption media. In some embodiments, this may include at least some portion of the shock absorption media being stretched over the computer readable data storage device to couple the shock absorption media to the computer readable data storage device. In some embodiments, the shock absorption media may also be affixed in place with a chemical means such as an adhesive or glue.

In an exemplary embodiment, the shock absorption media may be configured to prevent the computer readable data storage device from experiencing greater than about 900 g-forces (8.82 kilometers/square-second; 5.48 miles/square-second) per millisecond shock when the removable cartridge free falls from a height of about 36 inches (0.91 meters) onto a rigid surface. In other embodiments, the shock absorption media may be configured to prevent the computer readable data storage device from experiencing greater than about 500 g-forces (4.90 kilometers/square-second; 3.04 miles/square-second), 600 g-forces (5.88 kilometers/square-second; 3.65 miles/square-second), 700 g-forces (6.86 kilometers/square-second; 4.26 miles/square-second), or 800 g-forces (7.84 kilometers/square-second; 4.87 miles/square-second) per millisecond shock when the removable cartridge free falls from a height of about 36 inches (0.91 meters) onto a rigid surface.

In some embodiments, the shock absorption media may be configured to prevent the computer readable data storage device from experiencing any given shock, for example those detailed above, at any angle of impact. Merely by way of example, in embodiments where the chassis is rectangular, or other embodiments, the shock absorption media may be configured to prevent a given shock to the computer readable media during impacts at the corners of the chassis, the edges of the chassis, or the sides of the chassis.

In some embodiments the shock absorption media may be made from one or more materials. Merely by way of example, the shock absorption media may include a polymer, a plastic, a composite, a biomaterial or a gelatinous or liquid substance. In an exemplary embodiment, the shock absorption media may include a visco-elastic material, possibly C-1002 ISODAMP® vinyl polymers and/or C-1105 ISODAMP® vinyl polymers as manufactured by Aearo E-A-R Specialty Composites™ of Newark, Del. In embodiments where the shock absorption media includes a gelatinous or liquid substance, a polymer or other substance may be used to contain and/or confine the gelatinous or liquid substance within a certain general shape which allows the shock absorption media to be installed and configured within the removable cartridge as discussed herein.

The shock absorption media may take on a variety of shapes and sizes, possibly depending on the shape of the computer readable data storage device and the assembled or singular piece chassis. In an exemplary embodiment, the computer readable data storage device may be substantially rectangular in shape, possibly having two opposite sides which make up a majority of the surface area of the exterior of the computer readable data storage device. In some embodiments, the computer readable data storage device may have six sides and/or eight corners. In these or other embodiments, the computer readable data storage device may also have four sets of corners, where each set of corners comprises two proximate corners.

In some embodiments, the shock absorption media may have sixteen protrusions, where at least four protrusions are proximate to each set of corners. In these embodiments, each protrusion may possibly extend from a position on the side of the computer readable data storage device proximate to a set of corners to a side of the chassis proximate to a corner of the chassis. In these embodiments, three or more protrusions may at least partially compressively deform to reduce shock to the computer readable data storage device during a corner impact; four or more protrusions may at least partially compressively deform to reduce shock to the computer readable data storage device during an edge impact; and eight or more protrusions may at least partially compressively deform to reduce shock to the computer readable data storage device during a side impact.

In some embodiments, the shock absorption media may have six protrusions, where at least one protrusion is located between each side of the computer readable data storage device and the chassis. In some of these embodiments, each protrusion may be centrally located on each side of the computer readable data storage device and extend to a centrally located position on the interior of each side of the chassis. In these embodiments, three or more protrusions may at least partially compressively deform to reduce shock to the computer readable data storage device during a corner impact; two or more protrusions may at least partially compressively deform to reduce shock to the computer readable data storage device during an edge impact; and one or more protrusions may at least partially compressively deform to reduce shock to the computer readable data storage device during a side impact.

In some embodiments, the shock absorption media may have four protrusions, where at least one protrusion is proximate to each set of corners. In these embodiments, each protrusion may possibly extend from a set of corners on the computer readable data storage device to the corresponding interior set of corner of the chassis. In these embodiments, one or more protrusions may at least partially compressively deform to reduce shock to the computer readable data storage device during a corner impact; two or more protrusions may at least partially compressively deform to reduce shock to the computer readable data storage device during an edge impact; and all four protrusions may at least partially compressively deform to reduce shock to the computer readable data storage device during a side impact.

In some embodiments, the shock absorption media may have standardized interior dimensions (including or excluding interference fit dimensions) such that the shock absorption media will couple properly with a computer readable data storage device with standardized exterior dimensions, for example the SFF-8201 specification discussed above. This feature may allow the shock absorption media to be properly coupled with any computer readable data storage device conforming to such standardized specification. Likewise, the shock absorption media may have standardized exterior dimensions (including or excluding interference fit dimensions) such that the shock absorption media, with computer readable data storage device contained therein, may properly couple with the interior of standardized chassis component(s).

The standardized dimensions of a computer readable data storage device may be such that datum areas, or pads, as discussed above, are in standard locations. In some embodiments, the protrusions of the shock absorption media may be located such that they are in general proximity to such datum areas. In this manner, some embodiments of the invention will provide damping at or near the datum areas and datum points at which the computer readable data storage device was designed to be coupled with, or otherwise engage, other systems. These datum areas and datum points may be the locations at which the computer readable data storage device is configured to receive the most vibration without failure. In this manner, the shock absorption media may more effectively reduce the amount of shock felt by interior components of the computer readable data storage device.

In some embodiments, the removable cartridge may also include a data interface fixedly coupled with the chassis. The data interface may be configured to detachably couple with a mate-able data interface in the cartridge drive. The mated data interfaces may at least assist in reversibly coupling the removable cartridge with the cartridge drive via an interference fit. In other embodiments, additional mechanical or other components such as movable clips and/or cam mechanisms may at least assist in removably coupling the removable cartridge with the cartridge drive. In some embodiments, the removable cartridge may merely be supported by the cartridge drive when the data interfaces are coupled.

In these or other embodiments, the removable cartridge may also include a data conduit flexibly coupling the data interface with the computer data readable storage device. The data conduit may include an electrical conductor or an optical medium. Merely by way of example, a ribbon cable may couple multiple electrical conductors on the computer readable data storage device with multiple electrical conductors on the data interface. The flexible coupling provided by the data conduit may allow at least slight movement of the computer readable data storage device under mechanical shock conditions where the shock absorption media deforms to reduce shock transferred to the computer readable storage device.

In another embodiment of the invention, another removable cartridge for storing computer readable data is provided. The removable cartridge may include a first means for defining an interior space, where the first means is configured to be detachably and mechanically coupled with a cartridge drive. In some embodiments, the first means may possibly include at least any of the chassis configurations discussed herein.

In some embodiments, the removable cartridge may include a second means for storing computer readable data, where the second means is located at least partially within the interior space. In some embodiments, the second means may possibly include at least any of the computer readable data storage device configurations discussed herein.

In some embodiments, the removable cartridge may include a third means for reducing the amount of mechanical shock transferred from the first means to the second means. In some embodiments, the third means may possibly include at least any of the shock absorption media configurations discussed herein.

In some embodiments, the removable cartridge may include a fourth means for communicating computer readable data between the second means and the cartridge drive. In some embodiments, the fourth means may possibly include at least any of the data interfaces and/or data conduits discussed herein.

In another embodiment of the invention, a kit for making a removable cartridge for storing computer readable data is provided. In one embodiment, the kit may include a shock absorption media and a plurality of chassis components. The shock absorption media may possibly include at least any of the shock absorption media configurations discussed herein. The plurality of chassis components may possibly include any components necessary to create any of the chassis configurations discussed herein.

In one embodiment of the kit, a computer readable data storage device may be coupled with and/or deposited at least partially within the shock absorption media. The chassis components may be assembled to make an assembled chassis defining an interior space, and the combined computer readable storage device and shock absorption media may then be deposited at least partially within the interior space of the assembled chassis.

In some embodiments of the kit, the kit may also include the computer readable data storage device. In these or other embodiments, the kit may also include a data interface and a flexible data conduit which may be integrated with the removable cartridge at least as described herein.

Figure 1:
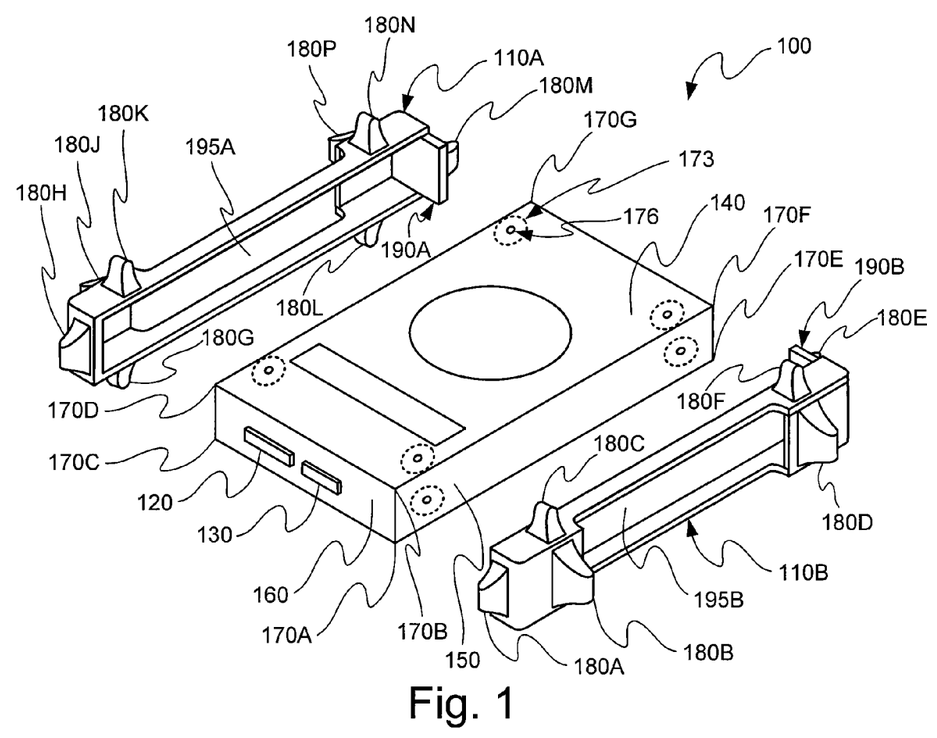
FIG. 1 is an axonometric exploded view of a computer readable data storage device with associated shock absorption media, where the shock absorption media includes two subcomponents.
Figure 1A:
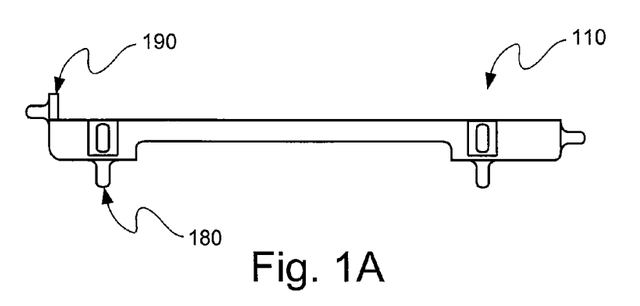
FIG. 1A is a top view of one of the subcomponent shock absorption media from FIG. 1.
Figure 1B:
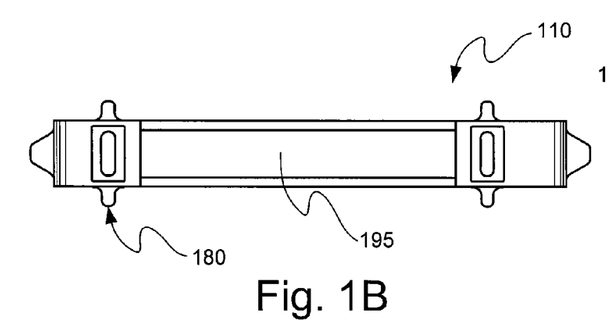
FIG. 1B is a side view of one of the subcomponent shock absorption media from FIG. 1.
Figure 1C:
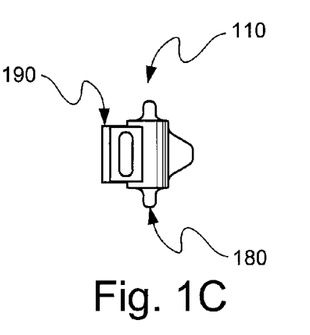
FIG. 1C is an end view of one of the subcomponent shock absorption media from FIG. 1.
Figure 1D:
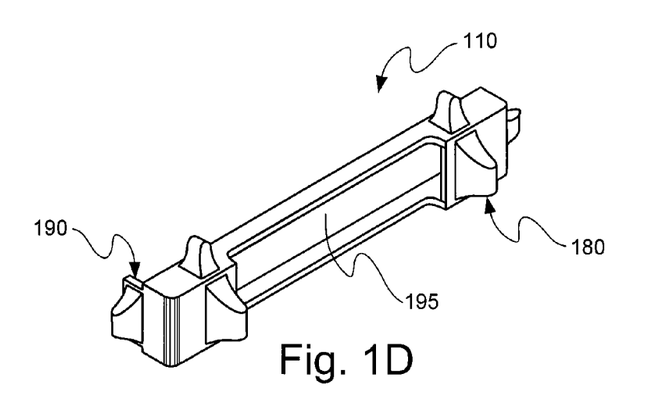
FIG. 1D is an axonometric view of one of the subcomponent shock absorption media from FIG. 1.

Turning now to FIG. 1, an axonometric exploded view of a computer readable data storage device 100 (shown in this example as a rotational storage disk drive) with associated shock absorption media 110 is shown. In this embodiment, the shock absorption media 110 includes two subcomponents 110A, 110B.

Computer readable data storage device 100, in this embodiment, is rectangular in shape. Computer readable data storage device 100 includes a data interface 120 and a power interface 130. A computer or other machine may exchange data with computer readable data storage device by communicating via data interface 120. Power for any internal workings of computer readable data storage device 100 may be provided via power interface 130.

Computer readable data storage device 100 may substantially include six sides: a top side 140, a bottom side (hidden from view in FIG. 1), a first side 150, a second side (hidden from view in FIG. 1), a back 160, and a front (hidden from view in FIG. 1). Computer readable data storage device 100 may also substantially include eight corners 170 (one corner hidden from view in FIG. 1).

The eight corners 170 may make up four sets of corners. A first set of corners may include corners 170A, 170B. A second set of corners may include corners 170C, 170D. A third set of corners may include corners 170E, 170F. A fourth set of corners may include corner 170G and the hidden corner.

In this embodiment, computer readable data storage device 100 also includes twelve datum areas 173 (six datum areas 173 are hidden from view in FIG. 1), and twelve data points 176 shown here as threaded cavities (six datum points 176 are hidden from view in FIG. 1). As discussed above, these exemplary datum areas 173 and datum points 176 may providing standardized mounting fixtures for other equipment to utilize the computer readable data storage device 100. In this embodiment, such standardized datum areas 173 will provide the primary areas of mechanical interaction with the flexible protrusions of a shock absorption media. In some embodiments, where a standardized computer readable data storage device 100 is employed, the datum areas 173 may be consistently sized and located, regardless of the manufacturer of the computer readable data storage device 100, while other exterior portions of the computer readable data storage device 100 may vary from manufacturer to manufacturer.

Shock absorption media 110 may include multiple protrusions 180. In this embodiment, shock absorption media 110 may include eight protrusions 180 on each subcomponent 110A, 110B. Some of the protrusions on subcomponent 110B may be hidden from view. FIG. 1A, FIG. 1B, FIG. 1C, and FIG. 1D provide top, side, end, and axonometric views respectively of the subcomponents of shock absorption media 110.

While in this embodiment shock absorption media 110 is shown having two subcomponents 110A, 110B, in other embodiments, shock absorption media 110 may include a fewer or greater number of components. In this embodiment, shock absorption media 110 may be made from a flexible material and be configured to be stretched over the sides of computer readable data storage device 100 to couple shock absorption media 110 thereto, and dispose computer readable data storage device 100 therein.

Shock absorption media components 110A, 110B may include multiple additional features besides protrusions 180. Tabbed extensions 190A, 190B may at least assist in allowing a person or machine to pull shock absorption media components 110A, 110B over computer readable data storage device 100 after back 160 of computer readable data storage device 100 has initially been coupled with shock absorption media components 110A, 110B.

In some embodiments, shock absorption media components 110A, 110B may include cavities 195A, 195B which may allow for less thermal resistance and greater heat dissipation over more of the surface area of computer readable data storage device 100. Furthermore, the reduced cross sectional area of the shock absorption media components 110A, 110B surrounding the cavities 195 may allow deformation related to interference fitting shock absorption media components 110A, 110B onto computer readable data storage device 100 to be at least partially limited to those areas instead of protrusions 180 which may therefore reserve more undeformed volume for impact resistance usage.

Figure 2:
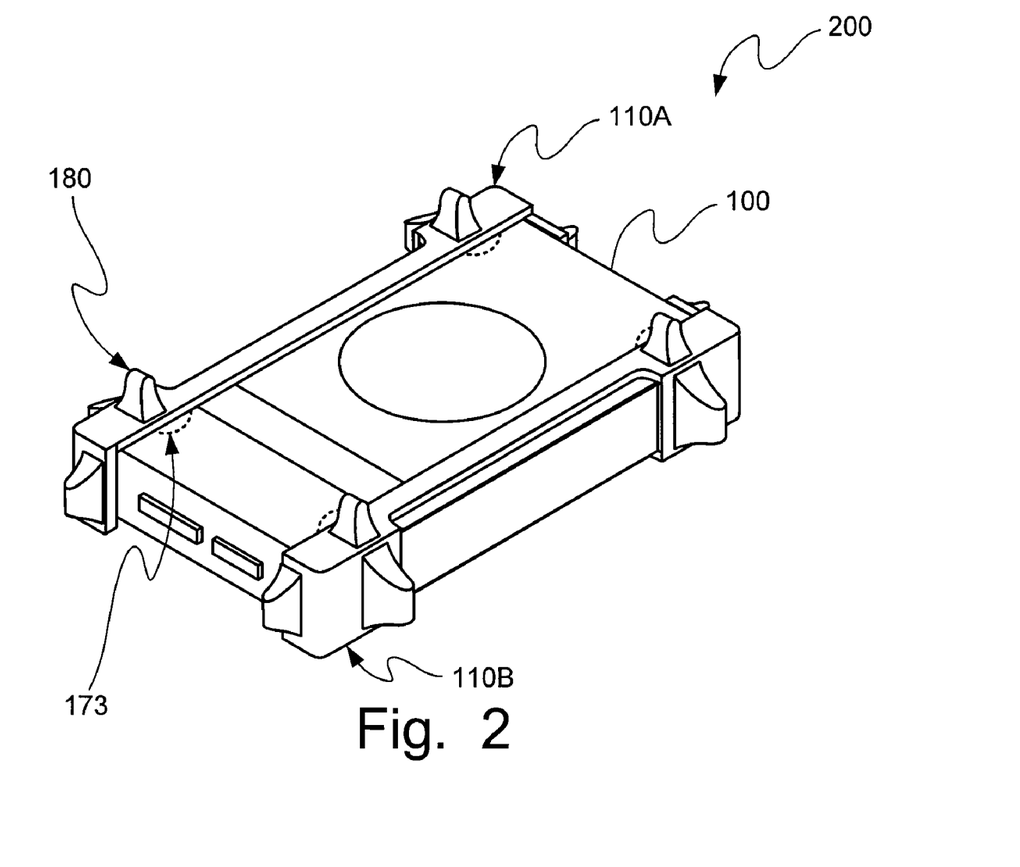
FIG. 2 is an axonometric assembled view of the computer readable data storage device and shock absorption media from FIG. 1.

FIG. 2 is an axonometric assembled view of computer readable data storage device 100 and shock absorption media 110 from FIG. 1. The assembly 200 shows the shock absorption media components 110A, 110B stretched over computer readable data storage device 100 in an interference and/or compression fit. In other embodiments, an adhesive and/or glue may be employed instead of an interference fit, especially where the shock absorption media 110 in its unstretched state is appropriately sized for coupling to computer readable data storage device 100. Note that the protrusions 180 of shock absorption media 110A, 10B are generally aligned with datum areas 173, maximizing the shock absorption characteristics of the system, and the protective value to computer readable data storage device 100.

Figure 3A:
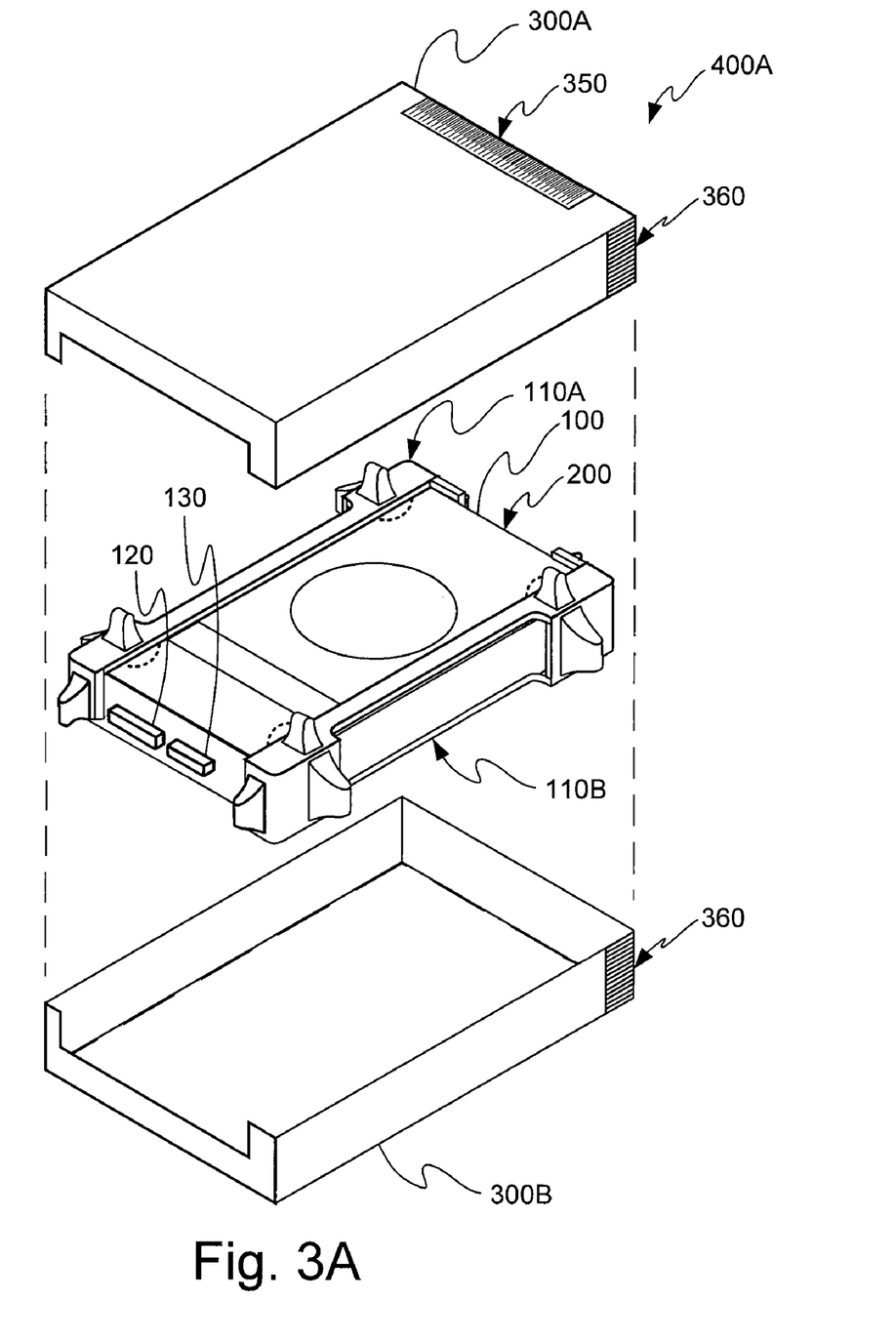
FIG. 3A is an axonometric exploded view of the computer readable data storage device and shock absorption media from FIG. 2, along with a chassis.
Figure 4A:
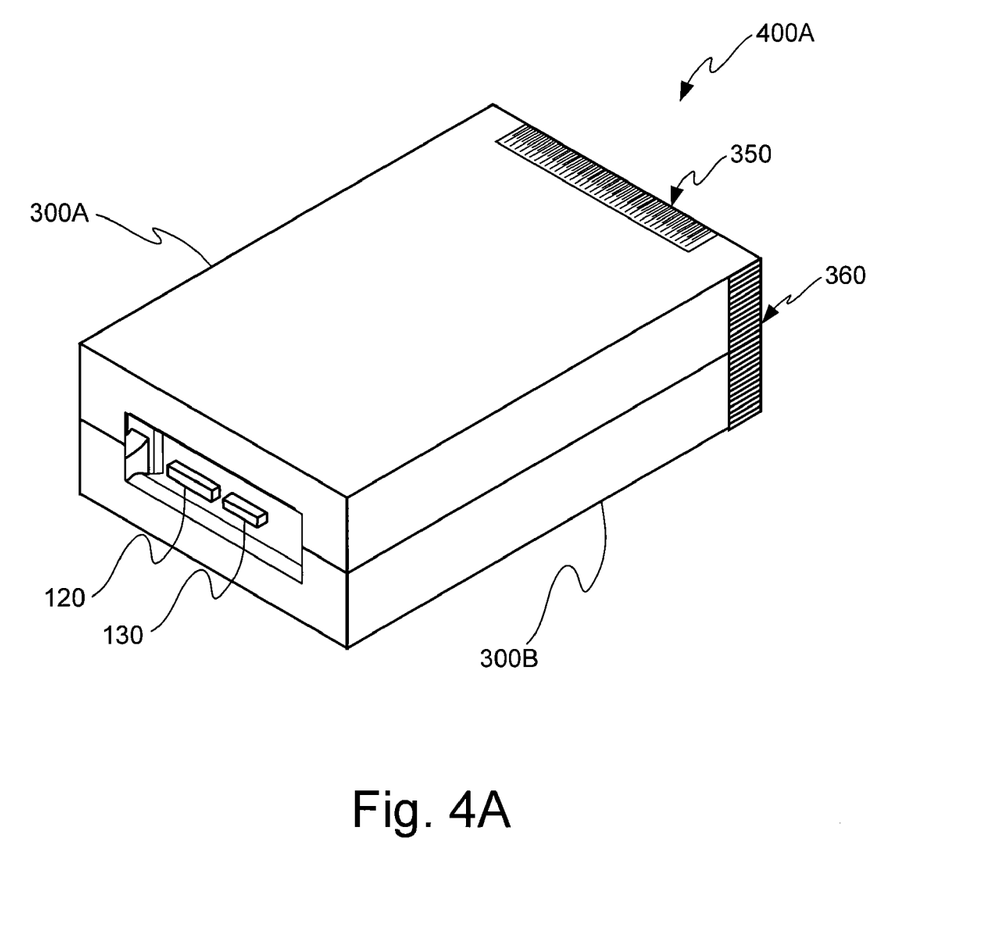
FIG. 4A is an axonometric assembled view of the components in FIG. 3A.

FIG. 3A is an axonometric exploded view of the computer readable data storage device 100 and shock absorption media 110 from FIG. 2. Also shown in FIG. 3A is a chassis 300. FIG. 4A is an axonometric assembled view of the components in FIG. 3A forming a removable cartridge 400A for storing computer readable data.

Chassis 300 may, in this embodiment, include two subcomponents 300A, 300B. Subcomponents 300A, 300B may be joined using any number of possible mechanical and/or chemical means. For example, screws or glue may be used to couple component 300A to component 300B when assembly of the removable cartridge 400A is completed.

In this embodiment, data interface 120 and power interface 130 may be accessible from the outside of chassis 300. Data interface 120 may for example be an electrical conductor or optical connection allowing a cartridge drive to communicate with computer readable data storage device 100 when removable cartridge 400A is reversibly or otherwise coupled with the cartridge drive. Likewise, power interface 130 may allow power to be provided from the cartridge drive to computer readable data storage device 100 when the removable cartridge 400A is reversibly or otherwise coupled with the cartridge drive.

Chassis 300 may also define ventilation passages 350 between the exterior and interior of chassis 300. Chassis 300 may also define grip features 360 to assist users in inserting and removing removable cartridge 400A from a cartridge drive, as well as otherwise handling removable cartridge 400A. In some embodiments, ventilation passages 350 may also be employed as grip features 360, and vice-versa.

Figure 3B:
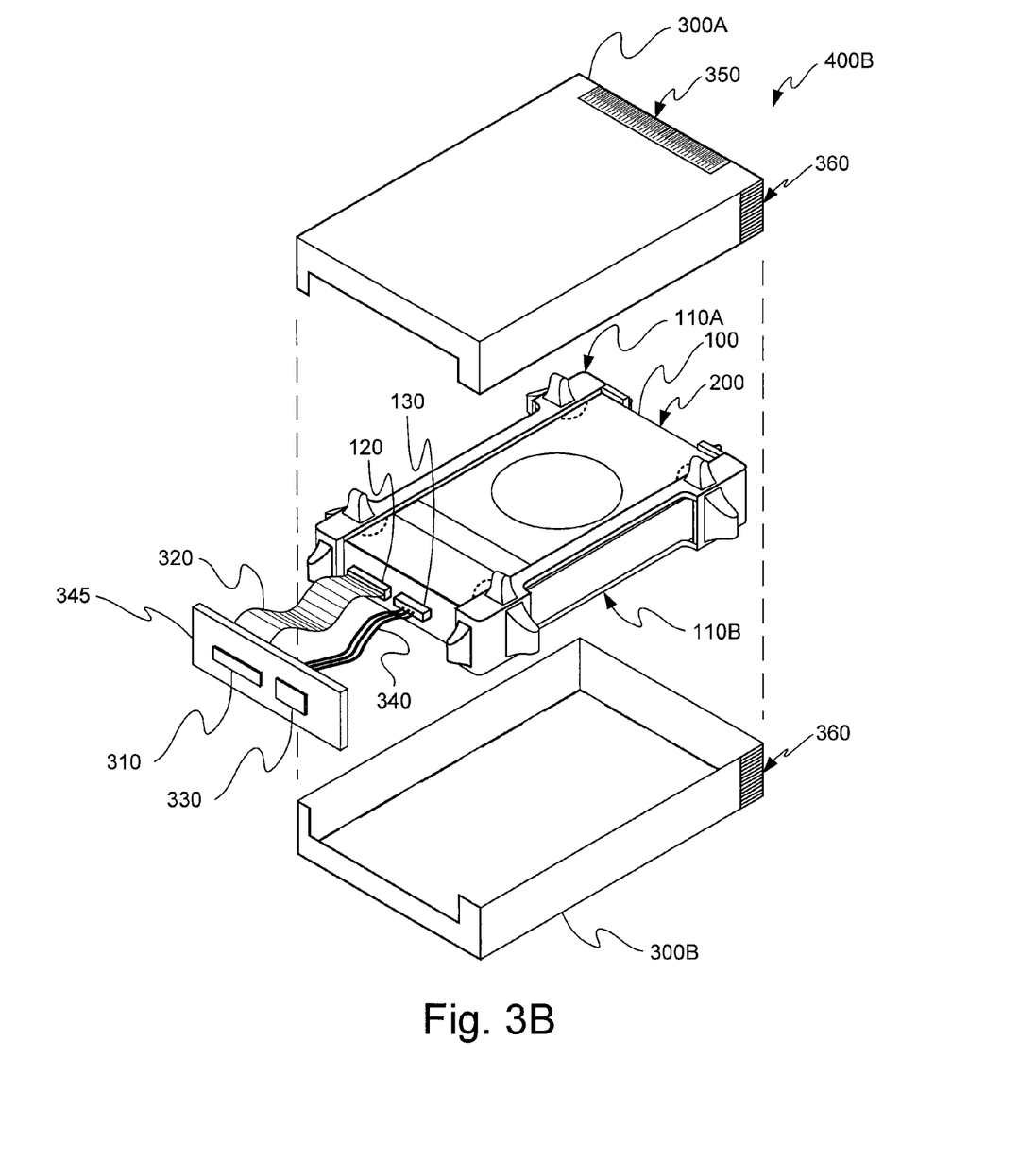
FIG. 3B is an axonometric exploded view of the computer readable data storage device and shock absorption media from FIG. 2, along with a chassis, external data interface, and data conduit.
Figure 4B:
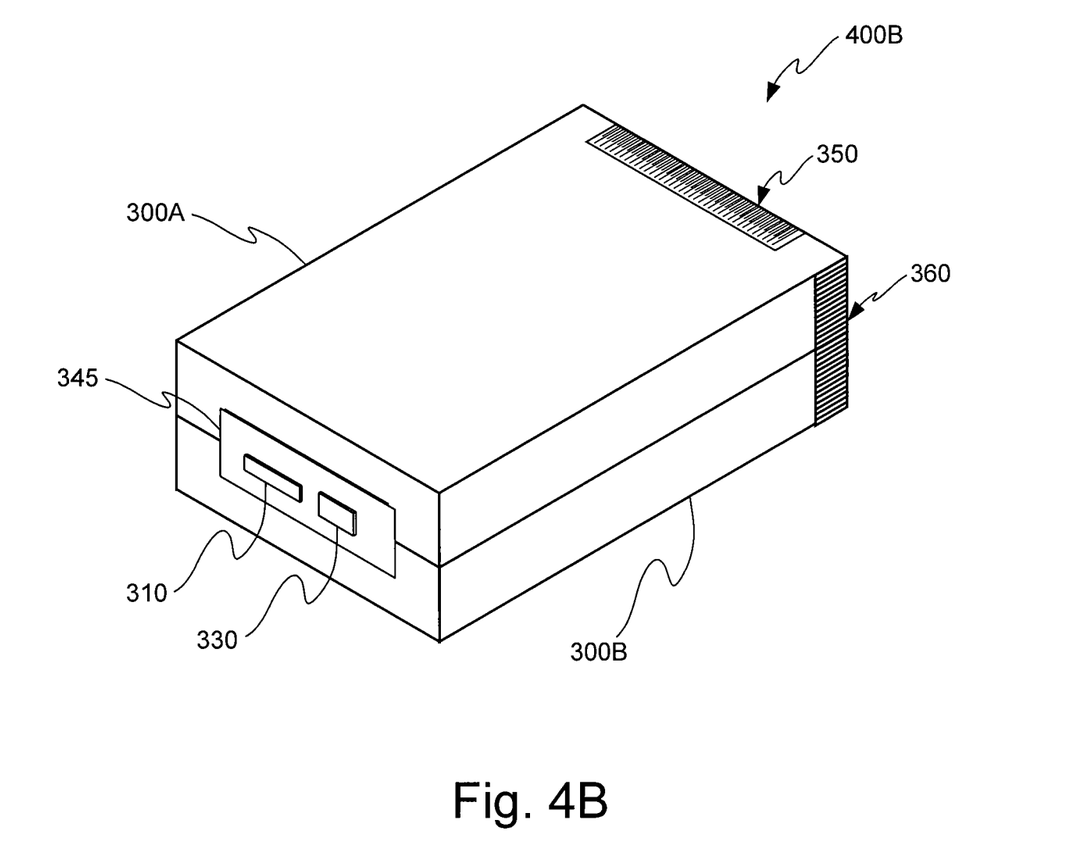
FIG. 4B is an axonometric assembled view of the components in FIG. 3B.

FIG. 3B is an axonometric exploded view of the computer readable data storage device 100 and shock absorption media 110 from FIG. 2. Also shown in FIG. 3B are a chassis 300, an external data interface 310, and a data conduit 320. FIG. 4B is an axonometric assembled view of the components in FIG. 3B forming a removable cartridge 400B for storing computer readable data.

Chassis 300 may, in this embodiment, include two subcomponents 300A, 300B. Subcomponents 300A, 300B may be joined using any number of possible mechanical and/or chemical means. For example, screws or glue may be used to couple component 300A to component 300B when assembly of the removable cartridge 400B is completed.

External data interface 310 may be coupled with data interface 120 on computer readable data storage device 100 via data conduit 320. As discussed above, external data interface 310 may for example be an electrical conductor or optical connection allowing a cartridge drive to communicate with computer readable data storage device 100 when removable cartridge 400B is reversibly or otherwise coupled with the cartridge drive. The flexibility of data conduit 320 may allow for movement of computer readable data storage device 100 during periods of shock without temporary or permanent uncoupling of external data interface 310 with data interface 120.

Likewise, external power interface 330 may be coupled with power interface 130 on computer readable data storage device 100 via power conduit 340. External power interface 330 may allow power to be provided from the cartridge drive to computer readable data storage device 100 when the removable cartridge 400B is reversibly or otherwise coupled with the cartridge drive. Power conduit 340 may also be flexible to allow for movement of computer readable data storage device 100 during periods of shock without temporary or permanent uncoupling of external power interface 330 with power interface 130. External data interface 310 and external power interface 300 may be integrated with an interface plate 345 which will complete some portion of chassis 300 once chassis components 300A, 300B are coupled with each other.

Chassis 300 may also define ventilation passages 350 between the exterior and interior of chassis 300. Chassis 300 may also define grip features 360 to assist users in inserting and removing removable cartridge 400B from a cartridge drive, as well as otherwise handling removable cartridge 400B. In some embodiments, ventilation passages 350 may also be employed as grip features 360, and vice-versa.

Figure 5:
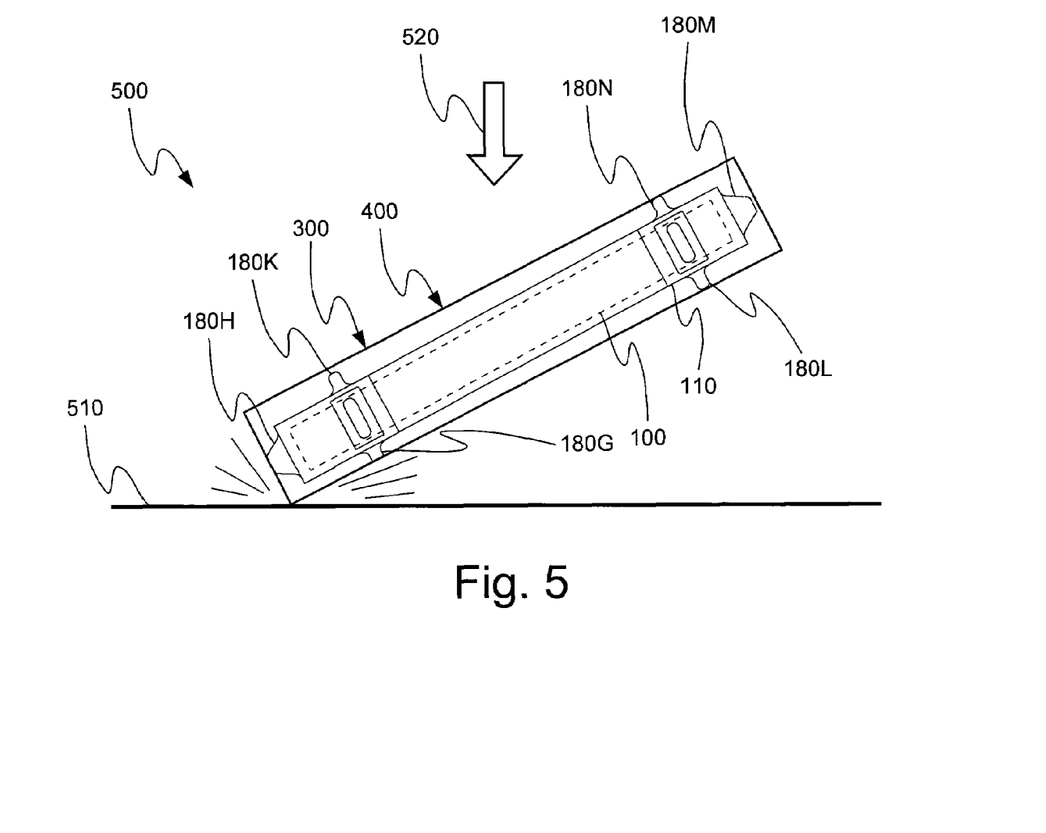
FIG. 5 is a side view showing the compression of the shock absorption media within the chassis during the moment of an angular impact.

FIG. 5 is a side view 500 showing the compression of shock absorption media 110 within chassis 300 during the moment of an angular impact of removable cartridge 400 with a rigid surface 510. In FIG. 5, cartridge 400 has been dropped in the direction of arrow 520 and hit rigid surface 510 at either a corner or edge of chassis 300. At the moment of impact, and thereafter, shock absorption media 110 may deform and reform such that computer readable data storage device 100 experiences less mechanical shock than chassis 300 does, thereby at least assisting in maintaining the integrity of computer readable data storage device 100.

In FIG. 5, one example of how deformation of protrusions 180 may possibly occur in some embodiments under these conditions is shown. At the moment of impact, at least protrusion 180H and protrusion 180G may compress, while at least protrusion 180K and protrusion 180M may expand. In some embodiments, some protrusions 180, for example protrusion 180K and protrusion 180M, may even move away from the interior walls of chassis 300. In other embodiments, no protrusions 180 may move away from the interior walls of chassis 300, but only expand, never losing contact the interior wall. In some embodiments, some combination thereof may occur.

Figure 6:
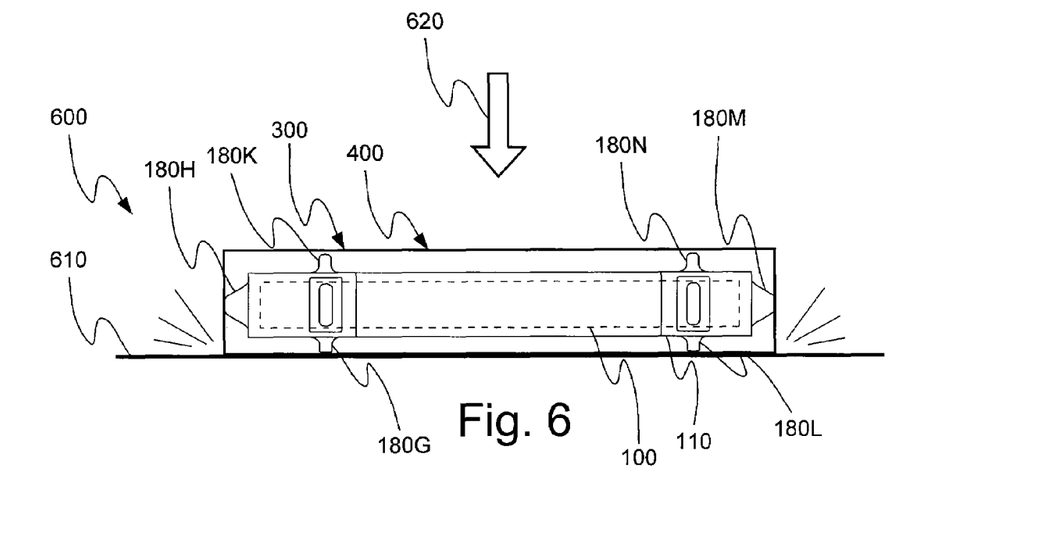
FIG. 6 is a side view showing the compression of the shock absorption media within the chassis during the moment of a flat impact.

FIG. 6 is a side view 600 showing the compression of the shock absorption media 110 within chassis 300 during the moment of a flat impact of removable cartridge 400 with a rigid surface 610. In FIG. 6, cartridge 400 has been dropped in the direction of arrow 620 and hit rigid surface 610 across a side of chassis 300. At the moment of impact, and thereafter, shock absorption media 110 may deform and reform such that computer readable data storage device 100 experiences less mechanical shock than chassis 300 does, thereby at least assisting in maintaining the integrity of computer readable data storage device 100.

In FIG. 6, one example of how deformation of protrusions 180 may possibly occur in some embodiments under these conditions is shown. At the moment of impact, at least protrusion 180G and protrusion 180L may compress, while at least protrusion 180K and protrusion 180N may expand. In some embodiments, some protrusions 180, for example protrusion 180K and protrusion 180N, may even move away from the interior walls of chassis 300. In other embodiments, no protrusions 180 may move away from the interior walls of chassis 300, but only expand, never losing contact the interior wall. In some embodiments, some combination thereof may occur.

It also should be noted that in some instances, some protrusions 180, in this or any other example, may experience both compression and tension, each effect at least possibly assisting in reducing shock experienced by computer readable data storage device 100. Merely by way of example, protrusion 180H and protrusion 180M may experience compression on their bottom side as computer readable data storage device 100 and shock absorption media 110 are driven to the bottom of chassis 300. Meanwhile, protrusion 180H and protrusion 180M may experience tensile stresses on their top side. This dual compression/tension effect may, in some instances, result from friction of protrusions 180 along the interior walls of chassis 300 as computer readable data storage device 100 and shock absorption media 110 are driven in a direction within chassis 300 at the moment of impact and afterwards when shock absorption media 110 returns to its static state.

The invention has now been described in detail for the purposes of clarity and understanding. However, it will be appreciated that certain changes and modifications may be practiced within the scope of the appended claims.

What is claimed is:

1. A removable rotational disk storage cartridge for storing computer readable data, the removable rotational disk storage cartridge comprising:
   a chassis, wherein:
      the chassis defines an interior space; and
      the chassis is configured to be detachably and mechanically coupled with a cartridge drive;
   a shock absorption media, wherein:
      the shock absorption media is deposited at least partially within the interior space of the chassis; and
      the shock absorption media comprises a flexible material; and
   a rotational storage disk drive; wherein:
      the rotational storage disk drive is configured to store computer readable data;
      the rotational storage disk drive comprises a power interface configured to receive power from the cartridge drive when the rotational disk storage cartridge is coupled to the cartridge drive; and
      the rotational storage disk drive is deposited at least partially within the shock absorption media such that the shock absorption media at least partially encases the rotational disk storage drive and resides between the rotational disk storage drive and the chassis.

2. The removable rotational disk storage cartridge for storing computer readable data of claim 1, wherein:

the rotational storage disk drive comprises a plurality of datum points, wherein the plurality of datum points are configured to be coupled with another device; and the shock absorption media further comprises a plurality of protrusions, wherein:

at least one of the plurality of protrusions is in proximity to at least one of the plurality of datum points; and at least one of the plurality of protrusions is configured to be substantially between at least one of the plurality of datum points and the chassis.

3. The removable rotational disk storage cartridge for storing computer readable data of claim 1, wherein the shock absorption media is configured to prevent the rotational storage disk drive from experiencing greater than about 900 g-forces (8.82 kilometers/square-second; 5.48 miles/square-second) shock when the removable rotational disk storage cartridge free falls from a height of about 36 inches onto a rigid surface.

4. The removable rotational disk storage cartridge for storing computer readable data of claim 1, wherein the rotational storage disk drive will experience greater than about 900 g-forces (8.82 kilometers/square-second; 5.48 miles/square-second) shock when the rotational storage disk drive free falls by itself from a height of about 36 inches onto a rigid surface.

5. The removable rotational disk storage cartridge for storing computer readable data of claim 1, wherein:

the rotational storage disk drive comprises six sides; and the shock absorption media comprises six protrusions, wherein at least one protrusion is located between each side of the rotational storage disk drive and the chassis.

6. The removable rotational disk storage cartridge for storing computer readable data of claim 1, wherein:

the rotational storage disk drive comprises eight corners; and the shock absorption media comprises four protrusions, wherein at least one protrusion is proximate to each corner.

7. The removable rotational disk storage cartridge for storing computer readable data of claim 1, wherein:

the rotational storage disk drive comprises four sets of corners, wherein each set of corners comprises two proximate corners; and the shock absorption media comprises sixteen protrusions, wherein at least four protrusions are proximate to each set of corners.

8. The removable rotational disk storage cartridge for storing computer readable data of claim 1, wherein the shock absorption media comprises a plurality of individual shock absorbent components.

9. The removable rotational disk storage cartridge for storing computer readable data of claim 1, wherein the shock absorption media is coupled with the rotational storage disk drive via an interference fit.

10. The removable rotational disk storage cartridge for storing computer readable data of claim 1, wherein the shock absorption media is at least partially compressed between the chassis and the rotational storage disk drive.

11. The removable rotational disk storage cartridge for storing computer readable data of claim 1, the removable rotational disk storage cartridge further comprising:

a data interface fixedly coupled with the chassis, wherein the data interface is configured to detachably couple with the cartridge drive; and a data conduit flexibly coupling the data interface with the rotational storage disk.

12. The removable rotational disk storage cartridge for storing computer readable data of claim 11, wherein the data conduit comprises an electrical conductor or an optical medium.

13. The removable rotational disk storage cartridge for storing computer readable data of claim 1, wherein the rotational storage disk drive comprises a retractable head assembly.

14. The removable rotational disk storage cartridge for storing computer readable data of claim 1, wherein the rotational storage disk drive comprises a magnetic storage disk or an optical storage disk.

15. A removable cartridge for storing computer readable data, the removable cartridge comprising:

a first means for defining an interior space, wherein the first means is configured to be detachably and mechanically coupled with a cartridge drive;

a second means for storing computer readable data, wherein the second means is located at least partially within the interior space, wherein the second means comprises a power interface configured to receive electrical power for operating the second means when the removable cartridge for storing computer readable data is coupled with the cartridge drive;

a third means for reducing the amount of mechanical shock transferred from the first means to the second means, wherein the third means is disposed between the first means and the second means, and at least partially surrounds the second means; and a fourth means for communicating computer readable data between the second means and the cartridge drive.

16. The removable cartridge for storing computer readable data of claim 15, wherein the third means is configured to prevent the second means from experiencing greater than about 900 g-forces (8.82 kilometers/square-second; 5.48 miles/square-second) shock when the removable cartridge free falls from a height of about 36 inches onto a rigid surface.

17. The removable cartridge for storing computer readable data of claim 15, wherein the third means comprises a plurality of individual shock absorbent components.

18. The removable cartridge for storing computer readable data of claim 15, wherein the fourth means comprises:

a data interface means for communicating computer readable data with the cartridge drive; and a data conduit means for flexibly coupling the data interface means with the second means.

19. A kit for making a removable cartridge for storing computer readable data, the kit comprising:

a shock absorption media, wherein the shock absorption media comprises a flexible material, the shock absorption media configured to accommodate a computer readable data storage device deposited at least partially within the shock absorption media and at least partially encased by the shock absorption media; and a plurality of chassis components, wherein:

the plurality of chassis components are configured to be assembled to make an assembled chassis, wherein the assembled chassis defines an interior space;

the assembled chassis is configured to be detachably and mechanically coupled with a cartridge drive; and the shock absorption media is configured to be deposited at least partially within the interior space of the assembled chassis.

20. The kit for making a removable cartridge for storing computer readable data of claim 19, wherein:

the computer readable data storage device comprises a plurality of datum points, wherein the plurality of datum points are configured to be coupled with another device; and the shock absorption media further comprises a plurality of protrusions, wherein at least one of the plurality of protrusions is configured to be in proximity to at least one of the plurality of datum points when the computer readable data storage device is deposited at least partially within the shock absorption media.

21. The kit for making a removable cartridge for storing computer readable data of claim 19, wherein the computer readable data storage device has a maximum width of about 2.76 inches, and a maximum length of about 3.955 inches.

22. The kit for making a removable cartridge for storing computer readable data of claim 19, further comprising the computer readable data storage device.

23. The kit for making a removable cartridge for storing computer readable data of claim 19, further comprising:

a data interface, wherein the data interface is configured to be fixedly coupled with the assembled chassis, wherein the data interface is configured to detachably couple with the cartridge drive; and a flexible data conduit, wherein the flexible data conduit is configured to couple the data interface with the computer readable data storage device.

24. The kit for making a removable cartridge for storing computer readable data of claim 19, wherein the shock absorption media is configured to be at least partially compressed between the assembled chassis and the computer readable data storage device.

* * * * *